United States Patent
Poshadlo

(10) Patent No.: US 6,250,421 B1
(45) Date of Patent: Jun. 26, 2001

(54) POWER-ASSISTED STEERING SYSTEM AND METHOD WITH COMPENSATION OF PULL INDUCED BY TIRE PRESSURE LOSS

(75) Inventor: Michael Lawrence Poshadlo, Garden City, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/531,655

(22) Filed: Mar. 21, 2000

(51) Int. Cl.[7] ........................................................ B62D 5/04
(52) U.S. Cl. ............................................. 180/446; 701/42
(58) Field of Search .................................. 180/402, 403, 180/417, 421, 422, 423, 443, 445, 446; 701/41, 42, 43, 44; 340/442, 445, 446, 447, 448

(56) References Cited

U.S. PATENT DOCUMENTS

| | | |
|---|---|---|
| 3,806,869 * | 4/1974 | Davis, Jr. ............................ 340/447 |
| 5,116,254 | 5/1992 | Sano et al. . |
| 5,238,079 | 8/1993 | Gorim . |
| 5,481,459 | 1/1996 | Bungeler . |
| 5,752,208 | 5/1998 | Lerner . |
| 5,925,083 * | 7/1999 | Ackermann ............................ 70/41 |

\* cited by examiner

*Primary Examiner*—Kevin Hurley
(74) *Attorney, Agent, or Firm*—Tarolli, Sundheim, Covell, Tummino & Szabo L.L.P.

(57) ABSTRACT

A power-assisted steering system (10) for a vehicle that has steerable front wheels (26 and 28) that are inflated. The system (10) includes a manually operated steering member (12) for steering input from a vehicle operator. A series of components (14–22) relays forces between the steering member (12) and the steerable front wheels (26 and 28). A motor (32) provides an assist steer force to steer the steerable wheels (26 and 28) in response to a force applied to the steering member (12). At least one tire pressure sensor (e.g., 66) monitors an inflation pressure of one of the front wheels (e.g., 26). A controller (42) determines and accordingly controls a compensating steer force to the steerable wheels (26 and 28), responsive to the monitored inflation pressure, which attenuates force transmitted to the steering member (12) due to front wheel inflation condition.

10 Claims, 2 Drawing Sheets

POWER-ASSISTED STEERING SYSTEM AND METHOD WITH COMPENSATION OF PULL INDUCED BY TIRE PRESSURE LOSS

TECHNICAL FIELD

The present invention is directed to power-assisted steering systems, and is specifically directed to systems that attenuate an undesirable torque or pulling force at a manually operated steering member.

BACKGROUND OF THE INVENTION

Power-assisted steering systems are known in the art. One example type of a powered-assisted steering system is a system that includes an electrical power assist motor and that is commonly referred to as an electric assist steering system. Typically, an electrical assist steering system that utilizes a rack and pinion gear set provides assistance force by using the electric motor to either (i) apply rotary force to a steering input shaft connected to the pinion gear, or (ii) apply linear force to a steering member that has the rack teeth thereon. The electric motor in such a system is controlled in response to sensed force (e.g., torque) applied to a manually operated steering member (e.g., a vehicle steering wheel) by an operator, and possibly other sensed parameters (e.g., vehicle speed).

The torque applied by the vehicle operator to the steering wheel is sensed via a torque sensor. Torque sensors for power-assisted steering systems are known in the art. A typical torque sensor for a power-assisted steering system is operatively connected between a steering input shaft and an output shaft. The input shaft is connected to the steering wheel and the output shaft is connected to the pinion of the rack and pinion steering gear set. The torque sensor includes a torsion bar connecting the input shaft to the output shaft. The torque sensor further includes a rotary position sensor adapted to monitor the amount of relative rotation between the input shaft and the output shaft that occurs as torque is applied to the steering wheel. The amount of relative rotation is functionally related to the strength of the torsion and the amount of steering torque applied to the steering wheel.

Due to the connection between the steering wheel and the rack and pinion steering gear set that is provided by the input shaft, the torsion bar, and the output shaft, torque from the rack and pinion steering gear set may also be transmitted to the steering wheel. Typically, a certain amount of torque (e.g., a resisting force) is desirable to provide the vehicle operator a certain amount of steering feel. However, torque applied to the steering wheel as a result of some types of vehicle events may be undesirable.

SUMMARY OF THE INVENTION

In accordance with one aspect, the present invention provides a power-assisted steering system for a vehicle that has steerable front wheels that are inflated. The system includes a manually operated steering member for steering input from a vehicle operator. Means relays forces between the steering member and the steerable front wheels. Means provides an assist steer force to steer the steerable wheels in response to a force applied to the steering member. Means monitors an inflation pressure of one of the front wheels. Means provides a compensating steer force to the steerable wheels, responsive to the monitored inflation pressure, which attenuates force transmitted to the steering member due to front wheel inflation condition.

In accordance with another aspect, the present invention provides a method of controlling a power-assisted steering system for a vehicle that has steerable front wheels that are inflated. Forces are relayed between a manually operated steering member and steerable front wheels. An assist steer force to steer the steerable wheels is provided in response to a force applied to the steering member. An inflation pressure of one of the front wheels is monitored. A compensating steer force is provided to the steerable wheels, responsive to the monitored inflation pressure that attenuates force transmitted to the steering member due to front wheel inflation condition.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF PREFERRED EMBODIMENT

Figure 1:
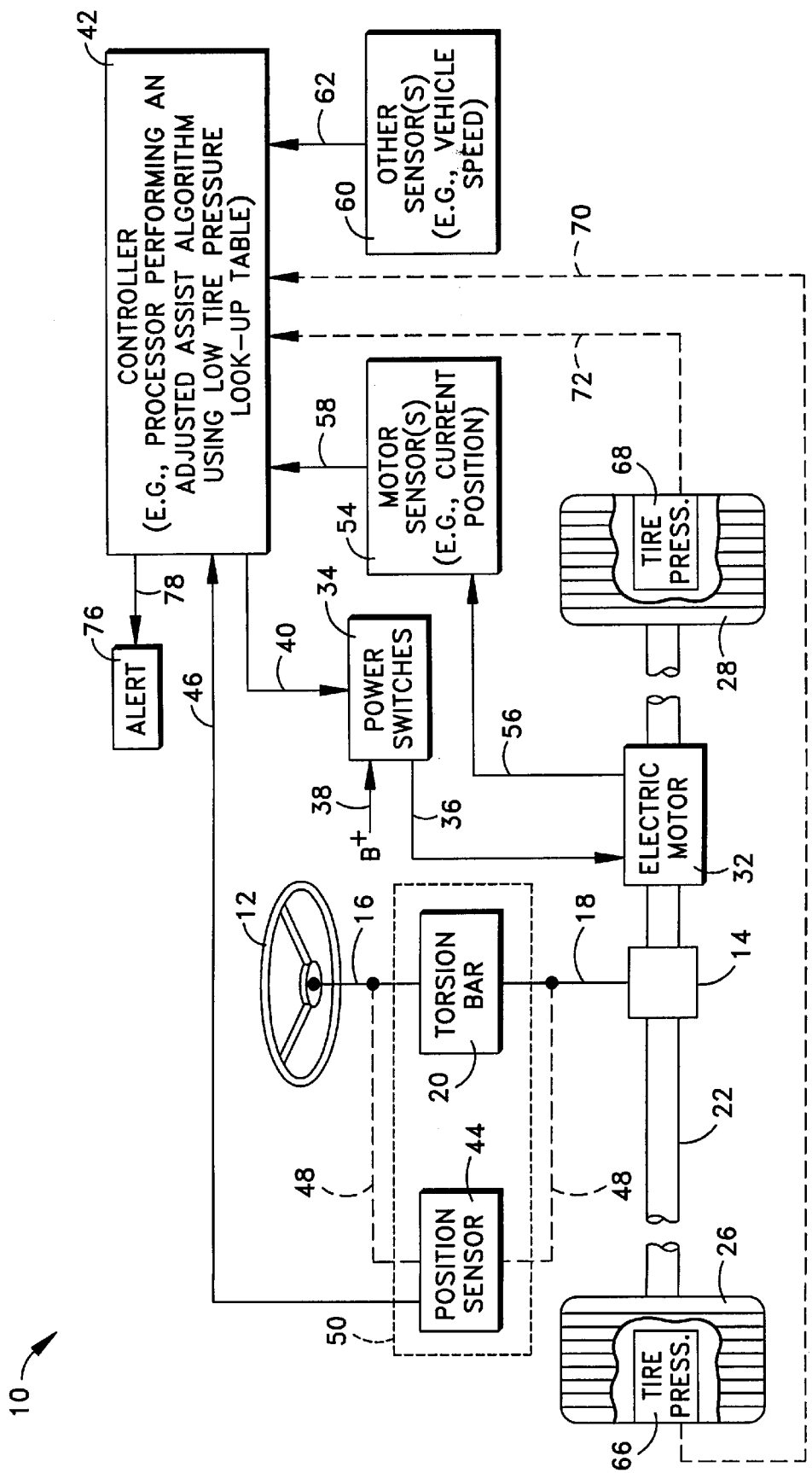
FIG. 1 is a schematic block diagram illustrating a power-assisted vehicle steering system in accordance with the present invention.

A power-assisted vehicle steering system 10 in accordance with the present invention is shown in FIG. 1. In the illustrated example, the steering system 10 is a direct-connection electric assist steering system. However, it is to be appreciated that the present invention is applicable to other vehicle power steering systems. The system 10 includes a steering wheel 12 that is manually operated by an operator (not shown) of a vehicle (not shown in total) within which the system is provided.

The steering wheel 12 is operatively connected to a rack and pinion gear set 14. Specifically, the steering wheel 12 is connected to an input shaft 16 and a pinion gear of the rack and pinion gear set 14 is connected to an output shaft 18. The input shaft 16 is operatively connected to the output shaft 18 through a torsion bar 20. The torsion bar 20 twists in response to applied torque thereby permitting relative rotation between the input shaft 16 and the output shaft 18. Stops (not shown) limit the amount of such relative rotation between the input and output shafts 16 and 18 in a manner well known in the art.

The pinion gear has helical teeth (not shown) that are meshingly engaged with straight cut teeth (not shown) on a rack gear of the rack and pinion gear set 14, wherein the rack gear is located on a rack member 22 (e.g., a linear motion member). The rack member 22 is steerably coupled to front wheels 26 and 28 of the vehicle. Thus, it to be understood that the front wheels 26 and 28 are the steerable wheels of the vehicle.

The coupling between the rack member 22 and the front wheels 26, 28 is via a steering linkage (not shown) in a known manner. When the steering wheel 12 is turned, the rack and pinion gear set 14 converts the rotary motion of the steering wheel into linear motion of the rack member 22. When the rack member 22 moves linearly, the front wheels 26, 28 pivot about their associated steering axis and the vehicle is steered.

An electric assist motor 32 is drivingly connected to the rack member 22. When the electric assist motor 32 is energized, it provides steering assist so as to aid in the rotation of the steering wheel 12 by the vehicle operator. In one example, the electric assist motor 32 is drivably connected to the rack member 22 with a ball-nut drive arrangement. When the electric assist motor 32 is energized, a rotor moves which, in turn, rotates a nut portion of the ball-nut drive arrangement. When the nut rotates, a plurality of ball bearings, within the ball-nut drive arrangement, transfer a linear force to the rack member 22. The direction of rack member movement is dependent upon the direction of drive force provided by the electric assist motor 32.

The provision of electrical energy to the electric assist motor 32 for driving the motor in either direction is via power switches that are operatively connected 36. The power switches 34 are operatively connected 38 to a source of electrical energy B+(e.g., a vehicle battery). The power switches 34 are operatively connected 40 to be controlled by a controller 42 of the steering system 10.

The controller 42 utilizes a plurality of sensory inputs to make determinations regarding electric motor control (i.e., actuation direction and force amount). A steering position sensor 44 is operatively connected 46 to the controller 42 to provide a first input to the controller. The steering position sensor 44 is operatively connected 48 across the input shaft 16 and the output shaft 18. The steering position sensor 44 provides an electrical signal that has a value indicative of relative rotational position between the input shaft 16 and the output shaft 18. Thus, in one respect, the steering position sensor 44, in combination with the torsion bar 20, form a torque sensor 50 (shown in phantom). Accordingly, the output signal of the steering position sensor 44 is indicative of the steering torque applied to the steering wheel 12 by the vehicle operator.

At least one motor sensor 54 is operatively connected 56 to the electric assist motor 32 and operatively connected 58 to the controller 42 for providing additional input to the controller. In one example, a plurality of motor sensors 54 is provided. One motor sensor is a rotor position sensor that is operatively connected to the motor rotor of the electric assist motor 32 and to the motor stator of the motor. The function of the rotor position sensor is to provide an electrical signal indicative of the position of the rotor relative to the stator. Another motor sensor is a current sensor that senses the current flow through the electric assist motor 32 as an indication of the force being applied by the motor.

Other sensory input to the controller 42 for use in determining control of the electric assist motor 32 may include any useful sensed vehicle parameter. For example, vehicle speed may be utilized within the calculation to determine the amount of assist force to be applied via operation of the electric assist motor 32. The other sensory input is provided by one or more sensors 60 that are operatively connected 62 to the controller 42.

It is to be appreciated that each the ground engaging wheels (only the front wheels 26, 28 shown) of the vehicle includes a tire that is inflated to have a predetermined desired inflation pressure. When one of tires of the ground-engaging wheels has a reduction in inflation pressure from the desired pressure value, the loss of pressure may create a pulling effect on the steering system 10. In particular, the loss of inflation pressure at a tire may create a pull or torque on the steering wheel 12. This is especially manifest if the tire inflation pressure loss occurs at one of the front steerable wheels 26, 28 of the vehicle.

For example, a loss of pressure in at left front wheel 26 will cause the vehicle to be pulled toward the left direction. The pulling effect is manifest as a counterclockwise rotational force on the steering wheel 12 due to the interconnection between the steering wheel and the front steerable wheels 26, 28. The rotational force of the steering wheel 12 could cause difficulty for the vehicle operator.

The power-assisted steering system 10 in accordance with the present invention operates to attenuate force that is transmitted to the steering wheel 12 due to front wheel inflation pressure loss. Specifically, the system 10 includes tire pressure sensors 66 and 68 that are operatively connected to sense tire inflation pressure at the wheels. In illustrated example, only the tire pressure sensors at the front wheels of the vehicle are shown because the rear wheels have been omitted. Each tire pressure sensor (e.g., 66) senses the inflation pressure within the associated tire.

Information regarding the inflation pressure is communicated 70, 72 to the controller 42. In the illustrated example, dashed lines indicate the communication 70, 72. The communication 70, 72 of inflation pressure information to the controller 42 may be by any suitable means and is dependent upon the construction and configuration of the tire pressure sensors 66, 68.

In one embodiment, each tire pressure sensor (e.g., 66) may be located within a respective tire (as shown in the illustrated example). The tire pressure sensor (e.g., 66) communicates with a portion of the vehicle outside of the tire via a radio frequency transmission. The vehicle portion that receives the radio frequency signal may be a communications portion of an overall vehicle system communication bus that is operatively connected to the controller. The dashed line communication 70, 72 of FIG. 1 thus represent the radio transmission, the communications portion, and the communication bus. Alternatively, the radio communication may be provided directly to the controller 42 via a suitably provided receiver operatively connected to the controller. Again, the dashed line communication 70, 72 represent such a conveyance. It is to be appreciated that other tire sense arrangements may be utilized including a hard-wired arrangement that receives pressure information via a rotary electrical or magnetic connection.

Upon the occurrence of a loss of pressure that would create a pulling effect, the controller 42 utilizes the sensory information indicating the loss of pressure to modify or compensate the amount of force that the electric assist motor 32 provides to the rack member 22. Specifically, the controller 42 modifies the control signals provided to the power switches 34 that control flow of electrical energy through the electric assist motor 32.

In one example, a processor within the controller 42 performs an algorithm that utilizes the pressure information to determine electric assist motor control. For example, the algorithm accesses a low tire pressure look-up table within a memory of the controller 42 to retrieve a compensation or modification value associated with the pressure value and the wheel that is experiencing the pressure loss. It is to be appreciated that the compensation or modification of force provided by the electric assist motor 32 is via an addition or subtraction of an adjustment amount from the force otherwise applied.

In addition, an alert device 76 is operatively connected 78 to receive a signal from the controller 42 upon the occurrence of an adjustment or modification due to a low tire pressure condition. The alert device 76 is provided within the vehicle to provide notice to the vehicle operator of the low tire pressure condition and the compensation or adjustment that is occurring within the steering system 10. In one example, the alert device 76 may be an indicator light located on an instrument panel (not shown) of the vehicle and/or may be an audio sound producing mechanism (not shown).

Figure 2:
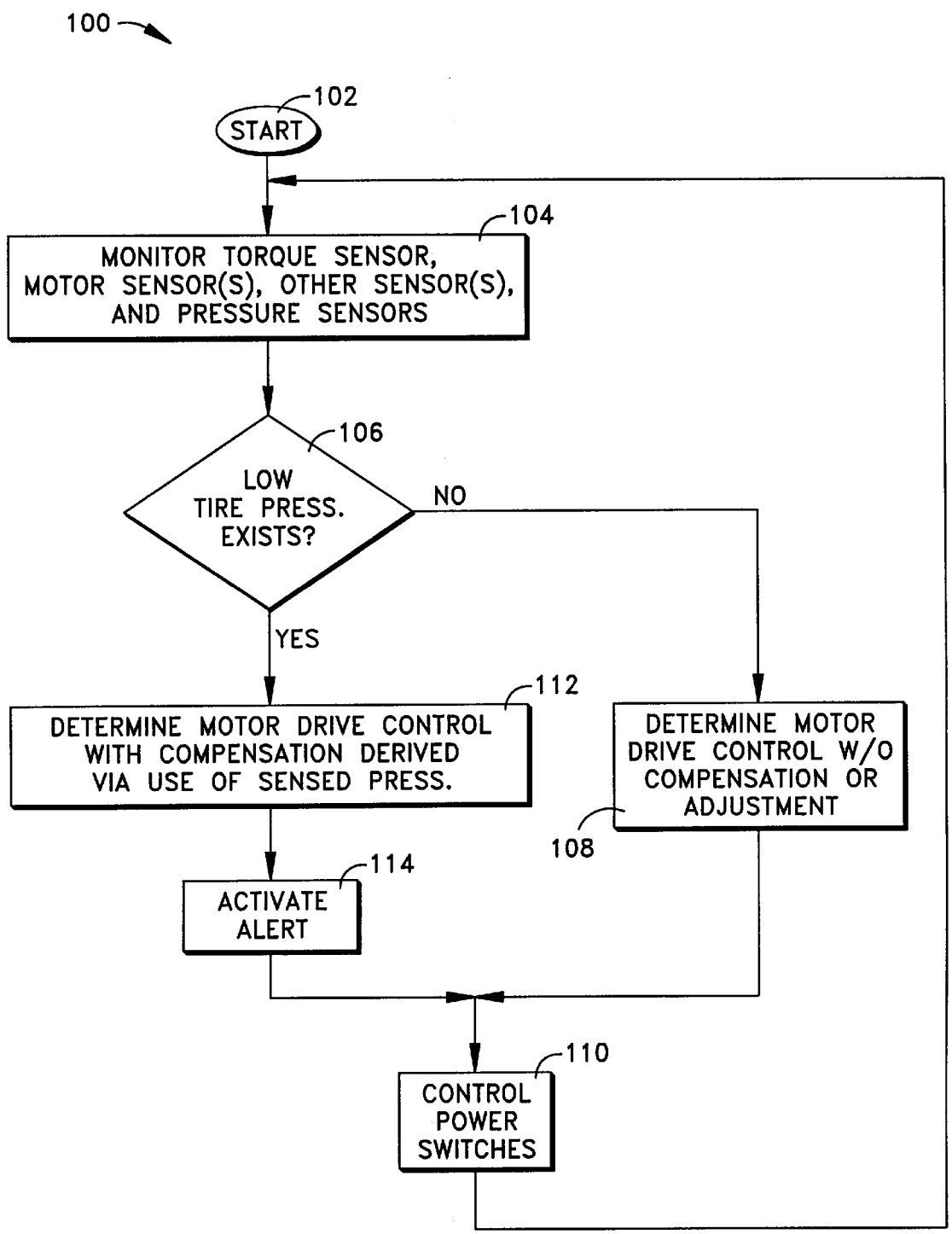
FIG. 2 is a flow chart for a process performed within the system shown in FIG. 1 and in accordance with the present invention.

A flow chart for a process 100 performed in accordance with the present invention is shown in FIG. 2. The process 100 is initiated at step 102 and proceeds to step 104. At step 104, the various sensory inputs (e.g., the signals from the steering position sensor 44, the motor sensor(s) 54, the other sensor(s) 60, and the tire pressure sensors 66, 68) are monitored to derive the sensory information therefrom. At step 106, it is determined whether a low tire pressure condition exists at one of the monitored tires.

If the determination at step 106 is negative (i.e., a low tire pressure does not exist), the process 100 proceeds from step 106 to step 108. At step 108, motor drive control is determined without a compensation or adjustment due to tire inflation condition. The process 100 proceeds from step 108 to step 110 in which the power switches 34 that provide electrical energy to the electric assist motor 32 are controlled accordingly. Upon completion of step 110, the process 100 loops to repeat step 104.

If a low tire pressure condition exists, the determination at step 106 is affirmative. Upon an affirmative determination at step 106 (i.e., a low tire pressure), the process 100 proceeds from step 106 to step 112. At step 112, the motor drive control is determined and then compensated or adjusted via use of sensed tire pressure. In pertinent part, the controller 42 determines which tire is experiencing a pressure loss and the amount of pressure that is being experienced. The controller 42 then proceeds to the look-up table to retrieve a compensation value. At step 114, the alert device 76 is activated such that the vehicle operator is made aware of the condition. The process 100 then proceeds to step 110 in which the power switches are controlled using the compensated determinations.

From the above description of the invention, those skilled in the art will perceive improvements, changes and modifications. Such improvements, changes and modifications within the skill of the art are intended to be covered by the appended claims.

Having described the invention, the following is claimed:

1. A power-assisted steering system for a vehicle having steerable front wheels that are inflated, said system comprising:
   a manually operated steering member for steering input from a vehicle operator;
   means for relaying forces between said steering member and the steerable front wheels;
   means for providing an assist steer force to steer the steerable wheels in response to a force applied to said steering member;
   means for monitoring an inflation pressure of one of the front wheels; and
   means for providing a compensating steer force to the steerable wheels, responsive to the monitored inflation pressure, that attenuates force transmitted to said steering member due to front wheel inflation condition.

2. A system as set forth in claim 1, wherein said means for providing an assist steer force includes an electric assist motor.

3. A system as set forth in claim 2, wherein said means for providing a compensating steer force includes means for modifying force provided by said electric assist motor.

4. A system as set forth in claim 1, includes means for monitoring inflation pressure of a plurality of wheels, said means for monitoring an inflation pressure of one of the front wheels being included within said means for monitoring inflation pressure of a plurality of wheels, and said means for providing a compensating steer force includes means, responsive to the monitored inflation pressure of the plurality of wheels, that attenuates force transmitted to said steering member due to front wheel inflation condition.

5. A system as set forth in claim 1, including means for providing a notification to a vehicle operator of the occurrence of an attenuation of force transmitted to said steering member due to front wheel inflation condition.

6. A method of controlling a power-assisted steering system for a vehicle having steerable front wheels that are inflated, said method comprising:
   relaying forces between a manually operated steering member and steerable front wheels;
   providing an assist steer force to steer the steerable wheels in response to a force applied to the steering member;
   monitoring an inflation pressure of one of the front wheels; and
   providing a compensating steer force to the steerable wheels, responsive to the monitored inflation pressure, that attenuates force transmitted to the steering member due to front wheel inflation condition.

7. A method as set forth in claim 6, wherein said step of providing an assist steer force includes the assist steer force by an electric assist motor.

8. A method as set forth in claim 7, wherein said step of providing a compensating steer force includes modifying force provided by the electric assist motor.

9. A method as set forth in claim 6, including monitoring inflation pressure of a plurality of wheels, said step of monitoring an inflation pressure of one of the front wheels being included within said step of monitoring inflation pressure of a plurality of wheels, and said step of providing a compensating steer force includes attenuating force transmitted to the steering member due to front wheel inflation condition derived from the monitored inflation pressure of the plurality of wheels.

10. A method as set forth in claim 6, including providing a notification to a vehicle operator of the occurrence of an attenuation of force transmitted to the steering member due to front wheel inflation condition.

* * * * *